United States Patent
Ariyasu et al.

(10) Patent No.: US 9,399,748 B2
(45) Date of Patent: Jul. 26, 2016

(54) LUBRICATING GREASE COMPOSITION

(75) Inventors: Takayuki Ariyasu, Kasama (JP); Daming Dong, Fujisawa (JP); Hiroshi Ozeki, Yamato (JP); Minoru Namiki, Chigasaki (JP); Terasu Yoshinari, Chigasaki (JP)

(73) Assignees: LUBE CORPORATION, Tokyo (JP); KYODO YUSHI CO., LTD., Fujisawa (JP)

( * ) Notice: Subject to any disclaimer, the term of this patent is extended or adjusted under 35 U.S.C. 154(b) by 0 days.

(21) Appl. No.: 13/879,167

(22) PCT Filed: Oct. 26, 2011

(86) PCT No.: PCT/JP2011/074624
§ 371 (c)(1),
(2), (4) Date: Apr. 12, 2013

(87) PCT Pub. No.: WO2012/057181
PCT Pub. Date: May 3, 2012

(65) Prior Publication Data
US 2013/0210688 A1    Aug. 15, 2013

(30) Foreign Application Priority Data
Oct. 27, 2010    (JP) ................................. 2010-240575

(51) Int. Cl.
| | | |
|---|---|---|
| *C10M 169/04* | (2006.01) | |
| *C01G 39/06* | (2006.01) | |
| *C10M 177/00* | (2006.01) | |
| *C07D 251/54* | (2006.01) | |
| *C10M 135/18* | (2006.01) | |
| *B23Q 11/10* | (2006.01) | |
| *B23Q 11/12* | (2006.01) | |
| *C10M 169/06* | (2006.01) | |
| *C10M 171/00* | (2006.01) | |
| *F16C 33/66* | (2006.01) | |

(52) U.S. Cl.
CPC ......... *C10M 169/04* (2013.01); *B23Q 11/1061* (2013.01); *B23Q 11/121* (2013.01); *C10M 169/06* (2013.01); *C10M 171/00* (2013.01); *F16C 33/6633* (2013.01); *C10M 2201/041* (2013.01); *C10M 2201/066* (2013.01); *C10M 2201/082* (2013.01); *C10M 2203/1006* (2013.01); *C10M 2203/1025* (2013.01); *C10M 2213/062* (2013.01); *C10M 2215/1026* (2013.01); *C10M 2215/222* (2013.01); *C10M 2219/068* (2013.01); *C10M 2227/09* (2013.01); *C10N 2230/06* (2013.01); *C10N 2250/10* (2013.01)

(58) Field of Classification Search
CPC ................. C10M 2219/068; C10M 2201/006; C10M 2201/0416; C10M 2201/0426; C10M 2201/056; C10M 2201/0666; C10M 2215/1026
USPC .................. 508/110, 113, 181, 167, 258, 443
See application file for complete search history.

(56) References Cited

U.S. PATENT DOCUMENTS

| | | | |
|---|---|---|---|
| 3,850,828 A | 11/1974 | Dodson et al. | |
| 5,922,654 A * | 7/1999 | Yamazaki et al. | 508/364 |
| 6,056,072 A * | 5/2000 | Koltermann et al. | 175/227 |
| 2004/0224859 A1 | 11/2004 | Numazawa | |
| 2009/0088354 A1* | 4/2009 | Berry et al. | 508/388 |
| 2011/0143973 A1* | 6/2011 | Ohno et al. | 508/100 |

FOREIGN PATENT DOCUMENTS

| | | |
|---|---|---|
| CN | 101560434 | 10/2009 |
| JP | 2000-303089 | 10/2000 |
| JP | 2003-340900 | 12/2003 |
| JP | 2004-59814 | 2/2004 |
| JP | 2004-076003 | 3/2004 |
| JP | 2004-204218 | 7/2004 |
| JP | 2005-053983 | 3/2005 |
| JP | 2005-308053 | 11/2005 |
| JP | 2007-231207 | 9/2007 |
| JP | 2008-081558 | 4/2008 |
| JP | 2008-231293 | 10/2008 |

OTHER PUBLICATIONS

International Search Report for PCT/JP2011/074624 mailed Jan. 31, 2012.
Written Opinion of the International Searching Authority mailed Jan. 31, 2012.
Taiwan Patent Office Official Action, issued for Taiwanese Patent Application No. 100138912, dated Nov. 14, 2013.
China Patent Office Official Action, issued for Chinese Patent Application No. 201180051490.2, dated Nov. 15, 2013.
Office Action mailed Sep. 16, 2014 in Japanese Patent Application No. 2010-240575 (3 pages) (with partial English translation on the Office Action).

* cited by examiner

*Primary Examiner* — Vishal Vasisth
(74) *Attorney, Agent, or Firm* — Nixon & Vanderhye P.C.

(57) ABSTRACT

The invention provides a lubricating grease composition with a worked penetration of 400 to 500 for a machine tool equipped with an automatic lubricator, containing a base oil having a kinematic viscosity at 40° C. of 10 to 200 mm$^2$/s and 0.1 to 10 mass % of solid particles insoluble in the base oil. The lubricating grease composition of the invention can be fed using the automatic lubricator attached to the machine tool, and can prevent the stick-slip from occurring on the sliding lubrication portion of the machine tool.

9 Claims, No Drawings

LUBRICATING GREASE COMPOSITION

This application is the U.S. national phase of International Application No. PCT/JP2011/074624 filed 26 Oct. 2011 which designated the U.S. and claims priority to JP 2010-240575 filed 27 Oct. 2010, the entire contents of each of which are hereby incorporated by reference.

TECHNICAL FIELD

The present invention relates to a lubricating grease composition used for machine tools equipped with an automatic grease lubricator, more particularly, used for a sliding surface portion of the machine tools to be lubricated. The lubricating grease composition of the invention can also be advantageously used for rolling portions to be lubricated, such as ball screws, linear guides and the like.

BACKGROUND ART

Lubricating oils have been conventionally used as the lubricating agent for machine tools having a sliding surface portion to be lubricated, and almost no grease has been used for those machine tools. That is because the grease, which is in a semi-solid state shows inferior flowing performance toward the sliding surface than the lubricating oil (in a liquid form), thereby frequently leading to the problem of poor lubrication. In addition, the semi-solid state grease has another disadvantage that it is difficult or impossible for an automatic lubricator to pump the grease.

The lubricating oil can be pumped, but an excess amount of lubricating oil is released while in use. Therefore, large quantities of lubricating oil are used, which produces the problem of increase in consumption cost of the lubricating oil. Further, the lubricating oil causes the problems that scattering of lubricating oil will impair the environment, atmosphere and machine itself, and a mist of lubricating oil will make the working environment worse.

In light of the above, there is an increasing demand for a grease that can be pumped with no waste to reduce the consumption, and minimum scattering.

The sliding surfaces of the machine tool can cause a spontaneous jerking motion, which is called a stick-slip phenomenon when the operation is started. The stick-slip has an effect on the processing precision. When the machine tool is started, the static friction becomes large because of the absence of a lubricating oil film, thereby inducing the stick-slip phenomenon. Theoretically, the thickness of the oil film reaches zero while the sliding surfaces are not operated. Therefore, the above-mentioned stick-slip phenomenon can occur when the operation is started.

The lubricating oil does not readily cause the stick-slip. This is because the lubricating oil has such excellent flowability to the sliding surfaces that the oil film can be formed immediately after the operation is started.

On the other hand, the grease cannot promptly form an oil film because of the poor flowability to the sliding surfaces. Improvement in the stick-slip resistance has been a serious topic in the grease.

SUMMARY OF INVENTION

Technical Problem

An object of the invention is to provide a lubricating grease composition that can be pumped by the automatic lubricator attached to a machine tool, and reduce the occurrence of stick-slip effect on the sliding surface portion of the machine tool to be lubricated.

Solution to Problem

To solve the above-mentioned problems, the inventors of the present invention tried to adjust the consistency of a lubricating grease composition by using a base oil having a particular kinematic viscosity and adding to the base oil solid particles insoluble in the base oil. Namely, the invention provides the following lubricating grease composition:

1. A lubricating grease composition with a worked penetration of 400 to 500 for a machine tool equipped with an automatic grease lubricator, comprising:

a base oil having a kinematic viscosity at 40° C. of 10 to 200 mm$^2$/s; and 0.1 to 10 mass % of solid particles insoluble in the base oil.

2. The lubricating grease composition described in the above-mentioned item 1, wherein the solid particles are those of at least one selected from the group consisting of organic molybdenum, polytetrafluoroethylene, melamine cyanurate, molybdenum disulfide, graphite and metal salts of dialkyldithiocarbamate.

3. The lubricating grease composition described in the above-mentioned item 1 or 2, wherein the base oil has a kinematic viscosity at 40° C. of 30 to 150 mm$^2$/s.

4. The lubricating grease composition described in any one of the above-mentioned items 1 to 3, wherein the machine tool has a sliding surface to be lubricated.

Advantageous Effects of Invention

According to the invention, lubrication can be carried out using an automatic lubricator attached to the machine tool, and the sliding surface of the machine tool to be lubricated can be prevented from causing the stick-slip phenomenon. By using the lubricating grease composition according to the invention, the processing precision can be therefore improved. Owing to minimum leakage, the lubricating grease composition of the invention can advantageously be used for the rolling parts attached to the machine tools, such as ball screws, linear guides and the like.

DESCRIPTION OF EMBODIMENTS

<Base Oil with a Kinematic Viscosity at 40° C. of 10 to 200 mm$^2$/s>

The base oil is required to have a kinematic viscosity at 40° C. of 10 to 200 mm$^2$/s. This range of kinematic viscosity is classified as a lower kinematic viscosity grade for the base oil of grease. When the kinematic viscosity at 40° C. exceeds 200 mm$^2$/s, the apparent viscosity of the grease becomes too high to smoothly pump the lubricating grease using the automatic lubricator. When the kinematic viscosity at 40° C. is less than 10 mm$^2$/s, it is impossible to form the effective oil film as the lubricating oil. For the same reasons as mentioned above, the kinematic viscosity at 40° C. of the base oil may preferably be 30 to 150 mm$^2$/s.

As far as the kinematic viscosity is within the above-mentioned range, any kinds of mineral oils and synthetic oils for the base oil of grease can be used alone or in combination. The mineral oils are preferable.

With respect to the mineral oils, both of paraffinic oils and naphthenic oils can be used. The paraffinic oils are preferable.

Examples of the synthetic oils include ester type synthetic oils such as diester oils, polyol ester oils and the like; synthetic hydrocarbon oils such as poly-α-olefin, polybutene, and the like; ether type synthetic oils such as alkyldiphenyl ethers, polypropylene glycol, and the like; and fluorine-containing synthetic oils such as perfluoroalkyl polyether oils and the like.

<Solid Particles Insoluble in Base Oil>

As the solid particles insoluble in the base oil, any organic and inorganic solid particles can be employed so long as the solid particles are insoluble in the base oil.

The above-mentioned solid particles include the solid lubricating agent, solid-state load carrying additive, and inorganic or organic solid particles.

Examples of the solid lubricating agent include polytetrafluoroethylene (PTFE), melamine cyanurate (MCA), molybdenum disulfide, and graphite. Examples of the solid-state load carrying additive include organic molybdenum and metal salts of dialkyldithiocarbamate. Examples of the inorganic solid particles include metal oxide such as zinc oxide, titanium oxide and the like, and metallic powders. As the organic solid particles, many kinds of solid particles including solid resin powders and solid food powders can be used. Of the above-mentioned examples, the solid lubricating agent and the solid-state load carrying additive are preferable. Namely, the solid particles may preferably be those of at least one selected from the group consisting of organic molybdenum, polytetrafluoroethylene (PTFE), melamine cyanurate (MCA), molybdenum disulfide, graphite and metal salts of dialkyldithiocarbamate. The organic molybdenum, PTFE and MCA are more preferably. In contrast to yellow particles of organic molybdenum, white particles of PTFE and MCA, and brown particles of metal salts of dialkyldithiocarbamate, for example, molybdenum disulfide and graphite are less preferable because those are black particles, which will lead to stain of the surrounding environment.

Desirably, the above-mentioned solid particles are contained in an amount of 0.1 to 10 mass % based on the total mass of the composition according to the invention. When the content is less than 0.1%, little effect is produced. Even if the above-mentioned content exceeds 10%, the resultant effect will be saturated. For the same reasons as mentioned above, the content of the solid particles may preferably be in the range of 0.2 to 5%.

Without wishing to be bound by any theory, the solid particles insoluble in the base oil are present between the sliding surfaces and can prevent the sliding surfaces from coming in direct contact while the machine tool is not operated. The grease (oily matter) can therefore stay between the sliding surfaces, which can improve insufficient thickness of the oil film when the processing operation is started to move the sliding surfaces. That may be the reason why the stick-slip phenomenon can be prevented.

<Worked Penetration of 400 to 500>

The grease having a worked penetration of 400 to 500 is classified as a semi-liquid grease with considerable softness. With the worked penetration being within the above-mentioned range, the lubricating grease composition of the invention can be pumped using the automatic lubricator.

The worked penetration of less than 400 may unfavorably result in plugging by the grease. The worked penetration of more than 500 means an extremely soft grease in a nearly liquid form, so that it is meaningless to change from the lubricating oil to the grease because the advantages of grease, that is, reduction of consumption cost of lubricating oil, less stain of the environment, the atmosphere and the machine, and improvement over deterioration of the operating environment by a mist of lubricating oil cannot be attained.

In light of the above, the worked penetration is 400 to 500, preferably 400 to 470.

<Thickener>

The lubricating grease composition of the invention may be prepared by adding a thickener to the base oil if necessary. Any thickener can be used with no limitation. When the PTFE is used as the solid particles insoluble in base oil, addition of another thickener is unnecessary because the PTFE can also serve as a thickener.

Examples of the thickener include soap type thickeners such as Li soap, Li complex soap and the like; urea type thickeners such as diurea, polyurea and the like; inorganic thickeners such as silica, organoclay and the like; and organic thickeners such as PTFE and the like.

From the viewpoint of versatility, the Li-soap thickeners and the diurea thickeners are preferable.

<Other Additives>

When necessary, general additives used in the conventional lubricating oils and grease compositions may be added.

More specifically, a load carrying additive, an antioxidant, a rust preventive, a metallic corrosion inhibitor and the like can be used.

Examples of the load carrying additive soluble in base oil include a phosphorus-containing load carrying additive such as phosphate ester or the like; a sulfur-containing load carrying additive such as polysulfide, sulfurized oils and fats, or the like; a phosphorus-sulfur containing load carrying additive such as phosphorothionate or the like; an organic metal salt type load carrying additive such as thiocarbamate containing organic molybdenum in a liquid form, thiophosphate, e.g., ZnDTP, or the like; and an organic amine salt type load carrying additive. The above-mentioned additive may typically be contained in an amount of 0.01 to 10 mass %.

<Machine Tool with Automatic Lubricator>

The machine tool equipped with an automatic lubricator used in the invention may have such a configuration as shown in FIG. 3 in JP 2005-233240 A, for example.

EXAMPLE 1

<Sample Lubricating Greases>

The components used for preparation of lubricating grease compositions according to Examples and Comparative Examples are shown below.

Base oil: Paraffinic mineral oils (having kinematic viscosities at 40° C. as shown in Table 1 and Table 2)

Solid particles insoluble in base oil:

Organic molybdenum A: Adeka Sakura-Lube 600 (made by ADEKA Corporation)

Organic molybdenum B: Molyvan A (made by R.T. Vanderbilt Company, Inc.)

PTFE: LUBRON L5F (made by DAIKIN Industries, Ltd.)

MCA: commercially available MCA of general grade

Copper carbamate (Copper alkyldithiocarbamate): Nocceler TTCU (made by Ouchi Shinko Chemical Industrial Co., Ltd.)

Molybdenum disulfide: commercially available molybdenum disulfide of general grade Graphite: commercially available graphite of general grade Organic molybdenum for comparison (liquid): Molyvan 822 (made by R.T. Vanderbilt Company, Inc.)

Thickener: aliphatic diurea (compound prepared from diphenylmethane-4,4'-diisocyanate and octylamine)

A given amount of diphenylmethane-4,4'-diisocyanate was reacted with a given amount of octylamine at a ratio by mole of 1:2 in the base oil as shown in Tables 1 and 2. The predetermined amount of solid particles insoluble in the base oil was added to the base oil and the resultant mixture was adjusted to have a specified consistency using a three roll mill. The kinematic viscosity of the base oil at 40° C. was determined in accordance with JIS K 2283. The term "mass %" in Tables 1 and 2 is based on the total mass of the sample grease.

<Test Methods>

Appearance: visual inspection

Pumpability: evaluated by determining the apparent viscosity under the following conditions using a rheometer.

(Test Conditions)

Temperature: 25° C.

Shearing modulus: 100 s$^{-1}$ (Evaluation Criteria)

1.5 Pa·s or less: acceptable (o)

More than 1.5 Pa·s: unacceptable (x)

Scattering properties: evaluated by conducting a dropping test under the following conditions.

(Test Method)

About 0.4 g of each sample grease was applied to the surface of a SPCC-SD stainless steel plate, and the plate was tilted at 45°. After a lapse of 5 seconds, the scattering properties were evaluated by checking whether the grease dropped (moved) or not.

(Test Conditions)

Temperature: 25° C.

(Evaluation Criteria)

No dropping: acceptable (o)

Dropping was found: unacceptable (x)

Stick-slip: evaluated by conducting a friction test under the following conditions and checking occurrence of the stick-slip phenomenon during the third reciprocating motion.

(Tester) Bowden Stick-Slip Tester (Test conditions) plane-to-plane contact: a plate (SPCC-SD stainless steel plate of 15 Mm×160 mm) and a stainless steel cylinder (with a diameter of 12 mm)

Load: 4 kgf (contact pressure: 343 kPa)

Sliding speed: 30 mm/m

Sliding distance: 20 mm

Sample grease: about 0.5 g

Temperature: 25° C.

(Evaluation Criteria)

Absence of stick-slip: acceptable (o)

Occurrence of stick-slip: unacceptable (x)

The results are shown in Tables 1 and 2.

TABLE 1

| | Examples | | | |
|---|---|---|---|---|
| | 1 | 2 | 3 | 4 |
| Worked Penetration | 460 | 460 | 460 | 415 |
| Kinematic Viscosity of Base Oil (mm$^2$/s) | 115 | 115 | 115 | 30 |
| Additive | Organic molybdenum A (solid particles) | PTFE (solid particles) | MCA (solid particles) | Organic molybdenum A (solid particles) |
| mass % | 1.0 | 3.0 | 1.0 | 5.0 |
| Thickener (mass %) | 3.5 | 3.5 | 3.5 | 4.6 |
| Appearance | Yellow | White | White | Yellow |
| Pumpability | o | o | o | o |
| Scattering | o | o | o | o |
| Stick-slip | o | o | o | o |

| | Examples | | | |
|---|---|---|---|---|
| | 5 | 6 | 7 | 8 |
| Worked Penetration | 460 | 460 | 460 | 460 |
| Kinematic Viscosity of Base Oil (mm$^2$/s) | 180 | 115 | 180 | 80 |
| Additive | Organic molybdenum B (solid particles) | Copper carbamate (solid particles) | Molybdenum disulfide (solid particles) | Graphite (solid particles) |
| mass % | 0.2 | 1.0 | 2.0 | 5.0 |
| Thickener (mass %) | 3.4 | 3.5 | 3.4 | 3.6 |
| Appearance | Yellow | Brown | Black | Black |
| Pumpability | o | o | o | o |
| Scattering | o | o | o | o |
| Stick-slip | o | o | o | o |

TABLE 2

| | Comparative Examples | | | | |
|---|---|---|---|---|---|
| | 1 | 2 | 3 | 4 | 5 |
| Worked Penetration | 370 | 530 | 460 | 460 | 415 |
| Kinematic Viscosity of Base Oil (mm$^2$/s) | 115 | 115 | 250 | 115 | 30 |
| Additive | Organic molybdenum A (solid particles) | Organic molybdenum A (solid particles) | Organic molybdenum A (solid particles) | — | Organic molybdenum (liquid) |
| mass % | 1.0 | 1.0 | 1.0 | — | 3.0 |
| Thickener (mass %) | 5.0 | 2.5 | 3.3 | 3.5 | 4.6 |
| Appearance | Yellow | Yellow | Yellow | Yellow | Brown |
| Pumpability | x | o | x | o | o |
| Scattering | o | x | o | o | o |
| Stick-slip | o | o | o | x | x |

The invention claimed is:

1. A lubricating grease composition with a worked penetration of 400 to 500 for a machine tool equipped with an automatic lubricator, comprising:

a base oil having a kinematic viscosity at 40° C. of 10 to 200 mm²/s, the base oil consisting of a paraffinic mineral oil, 0.1 to 10 mass % of solid particles insoluble in the base oil, the particles being selected from the group consisting of organic molybdenum, melamine cyanurate, molybdenum disulfide, graphite and metal salts of dialkyldithiocarbamate, a diurea thickener, and thiocarbamate containing organic molybdenum in a liquid form.

2. The lubricating grease composition of claim 1, wherein the solid particles are organic molybdenum.

3. The lubricating grease composition of claim 1, wherein the base oil has a kinematic viscosity at 40° C. of 30 to 150 mm²/s.

4. The lubricating grease composition of claim 1, wherein the machine tool has a sliding surface to be lubricated.

5. The lubricating grease composition of claim 1, wherein the content of the solid particles ranges 0.2 to 5% by mass based on the total mass of the composition.

6. The lubricating grease composition of claim 1, wherein the worked penetration of the grease ranges 400 to 470.

7. The lubricating grease composition of claim 1, further comprising thiophosphate.

8. The lubricating grease composition of claim 1, further comprising an antioxidant.

9. The lubricating grease composition of claim 1, further comprising a rust preventive.

\* \* \* \* \*